(12) United States Patent
Buzzi et al.

(10) Patent No.: US 9,725,150 B2
(45) Date of Patent: Aug. 8, 2017

(54) SYSTEM FOR AIDING THE PLANING OF PLANING BOATS

(71) Applicant: FPT Industrial S.p.A., Turin (IT)

(72) Inventors: Fabio Buzzi, Oggiono (IT); Enzo Pierro, Venaria Reale (IT)

(73) Assignee: FPT INDUSTRIAL S.P.A., Turin (IT)

( * ) Notice: Subject to any disclaimer, the term of this patent is extended or adjusted under 35 U.S.C. 154(b) by 202 days.

(21) Appl. No.: 14/427,896

(22) PCT Filed: Sep. 24, 2013

(86) PCT No.: PCT/EP2013/069803
§ 371 (c)(1),
(2) Date: Mar. 12, 2015

(87) PCT Pub. No.: WO2014/048904
PCT Pub. Date: Apr. 3, 2014

(65) Prior Publication Data
US 2015/0246715 A1   Sep. 3, 2015

(30) Foreign Application Priority Data

Sep. 25, 2012  (EP) .................................. 12185848

(51) Int. Cl.
| | | |
|---|---|---|
| B63H 21/21 | (2006.01) |
| F02B 37/14 | (2006.01) |
| F02D 41/00 | (2006.01) |
| F02B 37/04 | (2006.01) |
| F02B 39/04 | (2006.01) |
| B63H 21/14 | (2006.01) |
| B63B 1/18 | (2006.01) |
| B63H 21/17 | (2006.01) |
| B63H 21/38 | (2006.01) |

(52) U.S. Cl.
CPC ............... B63H 21/21 (2013.01); B63B 1/18 (2013.01); B63H 21/14 (2013.01); B63H 21/17 (2013.01);
(Continued)

(58) Field of Classification Search
CPC .............................. B63H 21/21; B63H 21/14
(Continued)

(56) References Cited

U.S. PATENT DOCUMENTS 2,447,388 A * 8/1948 Baak .................. F02D 9/00
                                                   417/14
2,511,348 A * 6/1950 Kittler ................ F02B 37/12
                                                  123/376

(Continued)

FOREIGN PATENT DOCUMENTS

GB    2182391 A    5/1987
JP    H06248965 A  9/1994

*Primary Examiner* — Lars A Olson
*Assistant Examiner* — Jovon Hayes
(74) *Attorney, Agent, or Firm* — Stetina Brunda Garred and Brucker

(57) ABSTRACT

System for aiding the planing of a planing boat comprising a hull, having a critical transition speed from a displacement sailing and a planing sailing and at least an internal combustion engine comprising means for transmitting an engine displaced power to the water; transmission means defining a gear ratio and identifying a critical speed of rotation of the engine corresponding to the critical speed of the hull; the system comprises a centrifugal supercharger, for supercharging said internal combustion engine, activated by speed multiplying means to be operating in a predetermined interval of speeds of the at least an internal combustion engine including said critical engine speed.

24 Claims, 4 Drawing Sheets

(52) U.S. Cl.
CPC ............ *B63H 21/38* (2013.01); *F02B 37/04* (2013.01); *F02B 37/14* (2013.01); *F02B 39/04* (2013.01); *F02D 41/0007* (2013.01); *Y02T 10/144* (2013.01)

(58) Field of Classification Search
USPC ............................................................ 440/1
See application file for complete search history.

(56) References Cited

U.S. PATENT DOCUMENTS

| | | | | |
|---|---|---|---|---|
| 4,903,488 | A * | 2/1990 | Shibata | F02B 37/04 123/562 |
| 5,425,239 | A * | 6/1995 | Gobert | F02B 37/00 60/605.2 |
| 6,343,473 | B1 * | 2/2002 | Kanesaka | F02B 33/34 60/609 |
| 6,951,211 | B2 * | 10/2005 | Bryant | F01B 7/12 123/316 |
| 7,458,369 | B2 * | 12/2008 | Ozawa | F01D 25/20 123/559.1 |
| 7,832,383 | B2 * | 11/2010 | Ozaki | F02B 29/0475 123/564 |
| 2006/0016437 | A1 * | 1/2006 | Ozawa | F02B 33/34 123/564 |
| 2015/0246715 | A1 * | 9/2015 | Buzzi | B63H 21/14 440/1 |

* cited by examiner

SYSTEM FOR AIDING THE PLANING OF PLANING BOATS

CROSS REFERENCE TO RELATED APPLICATIONS

The present application claims priority to PCT International Application No. PCT/EP2013/069803 filed on Sep. 24, 2013, which application claims priority to European Patent Application No. 12185848.4 filed Sep. 25, 2012, the entirety of the disclosures of which are expressly incorporated herein by reference.

STATEMENT RE: FEDERALLY SPONSORED RESEARCH/DEVELOPMENT

Not Applicable.

APPLICATION FIELD OF THE INVENTION

The present invention refers to the nautical field and in particular and more precisely to a system for aiding the planing of planing boats.

DESCRIPTION OF THE PRIOR ART

At low speed, every hull moves in displacement condition.

The fastest hulls, on the contrary, are designed and made so that, after a certain critical speed, they pass to the planing condition, wherein the hull slides on the water surface.

In such second condition, the drag offered by the water is reduced, allowing a remarkable fuel saving or a high cruising speed.

Planing hulls usually have a truncated stern in order to facilitate the detachment of fluid threads during the sliding of the hull on the water surface.

On the contrary, the hull of displacement boats have a rounded stern, to ease the fluid threads when the stern is immersed in water.

This implies that the displacement of a planing hull is not good, since its stern is almost sucked down by the water, which slows its forward movement.

It is thus evident that a planing hull needs a lot of energy to exceed the aforementioned critical speed to achieve the planing condition.

In the displacement sailing, the hull speed is mainly a function of the buoyancy length, while, when planing, it is a function of the power/weight ratio of the hull.

Passing from displacement to planing requires a remarkable effort to the engines, which makes them operate near their maximum power, with, in addition, the great difficulty of doing such effort at low speed (generally between 7 and 18 knots), thus when the engine speed is still low and consequently its power is low.

Reducing the propeller size/pitch means increasing the gear ratio, moving the working point towards a higher power point at said critical speed. This facilitates the passage to the planing condition, but, immediately after that, the drag torque applied to the propeller decreases abruptly, which results in the risk of making the engine reach its runaway speed rate, with the hull having a speed substantially lower than its maximum one.

Since it is difficult to estimate the drag torque opposing the forward movement of the hull, in general a theoretical propeller is realized, which is able to bring the hull at a predetermined maximum speed, so that the gear ratio is such that it is possible to avoid the engine speed to reach its runaway speed rate. After that, by means of empirical tests, the propeller size and/or pitch are gradually decreased until a trade-off is found that allows the hull to plane as fast as possible, without exceedingly reducing the maximum speed of the hull and without exceedingly increasing the engine's speed rate.

Due to economical reasons, for tens of years, internal combustion engines equipping watercrafts have been derived from the ones used on industrial or ground vehicles, with one- or two-stage superchargers, connected in series or in parallel between each other. For economical reasons they are modified as less as possible to be used in the nautical field.

Watercrafts equipped with such propeller, in spite of having a low weight/power ratio, reach with difficulty such critical speed, and thus such planing condition, which can take even some tens of second. This is because such propellers derived from the automotive field deliver an extremely low torque at low engine speeds, relying on the presence, in the automotive field, of a multiple speed gearbox and of the clutch.

Such problem is well known to marine engines manufacturers.

Even the use of positive displacement superchargers proved to be unsatisfying. Positive displacement superchargers, in fact, are able to provide a torque increase of about 20-25% at low engine speeds, but such increase is not sufficient to solve the planing problem.

Thus the constructors have searched alternative solutions, in order to increase the torque at the propeller at low speed, and they have introduced two-speed gearboxes or torque converters. The gearing of such devices, apart from being expensive and cumbersome, provide frictions, above all at high engine speeds, due to the ventilation of the lubricant.

Other solutions relate to the use of flaps in order to facilitate the stern lifting from water.

In practice, it can be stated that the solutions of the prior art relate essentially to modifications of the hull or of the transmission line of the driving force.

SUMMARY OF THE INVENTION

Therefore the aim of the present invention is to overcome all the aforementioned drawbacks and to provide a system for aiding the planing of planing boats.

Firstly, numerous examples have been made with different type and size of planing hulls motorized with both diesel and gasoline engines, with various engine sizes.

For example, it has been detected that the aforementioned critical speed of the hull is related, in case of diesel engines, to a speed of the internal combustion engine comprised between 800 and 1600 rpm.

It has been discovered, therefore, that the planing problem may occur at different speeds, around 1200 for high-powered engines (above 7000 cc), running at 2400 rpm, while for engines deriving from automotive applications, which run at around 4000 rpm, it occurs at around 2000 rpm, thus it is possible to say that such planing difficulty occurs at about 50% of the maximum engine speed.

For our convenience, in the following, the term "critical speed" will indicate an engine speed corresponding to the critical speed of the hull.

The object of the present invention is also a system for aiding the planing in planing boats, in accordance with claim 1.

According to the present invention, a centrifugal supercharger is provided to operate in a limited engine speed interval, including said critical speed, so as to allow the propeller to provide a driving torque that exceeds the drag torque offered by the hull in displacement condition, in order to pass to the planing sailing in a few seconds.

In order to offer such driving torque at such a low engine speed, the centrifugal supercharger is driven by a speed multiplier, so that it can work at the highest possible speed in correspondence of said limited engine speed interval.

According to a first alternative embodiment such predetermined interval of engine speed wherein the centrifugal supercharger activates is comprised between the idle speed of the internal combustion engine and about 50% of the maximum engine speed, namely about 1200-1600 rpm, depending on the size of the engine itself. For example 1200 rpm for an engine whose size exceeds 7000 $cm^3$, and 1600 rpm for an engine whose size is comprised between 4000 and 7000 $cm^3$.

According to a second preferred alternative embodiment of the invention said interval of engine speeds is centred on said critical engine speed.

According to a third preferred alternative embodiment of the invention, said predetermined interval has an upper limit corresponding to the critical engine speed plus 100-200 rpm.

According to a fourth preferred alternative embodiment of the invention said predetermined interval has a lower limit corresponding to said engine idle speed.

According to a fifth preferred alternative embodiment of the invention said predetermined interval has a lower limit corresponding to said engine idle speed plus 100-200 rpm.

According to a sixth preferred alternative embodiment, said internal combustion engine is equipped with its own supercharger from its origin, and thus said centrifugal supercharger is suitable for the supercharging of the heat engine until such original supercharger is activated.

Once the hull starts planing, such drag torque decreases abruptly, thus the centrifugal supercharger can be deactivated manually or automatically, since as the engine speed increases also the supercharging pressure generated by the main stage supercharger will increase. For example, the centrifugal supercharger may be deactivated automatically, in correspondence of a marked pressure increase of the supercharger/s equipping the heat engine from its origin.

Deactivation means, independent from the possible other original superchargers equipping the engine from its origin, may be used. For example, such deactivation means may be operated depending on the speed of the internal combustion engine.

According to another preferred alternative embodiment of the invention, such centrifugal supercharger provides a pressure of at least 0.5 bar, at least in correspondence of said limited interval of engine speeds, namely when the supercharging of the original supercharger (main) is still almost equal to zero. Advantageously, such supercharger pressure, at such a low engine speed, can be reached with a small supercharger with a speed of 30000 rpm, that may be activated in different ways.

Since it is very easy to house a small centrifugal supercharger reaching at least 30000 rpm, the present invention is particularly suitable also for after-sale installations.

Thus the present invention is particularly suitable to be adopted also on existing watercrafts, as a retrofit kit.

The claims are an integral part of the present description.

BRIEF DESCRIPTION OF THE FIGURES

Further purposes and advantages of the present invention will become clear from the following detailed description of a preferred embodiment (and of its alternative embodiments) and the drawings that are attached hereto, which are merely illustrative and non-limitative, in which.

In the figures the same reference numbers and letters identify the same elements or components.

DETAILED DESCRIPTION OF PREFERRED EMBODIMENTS OF THE INVENTION

Figure 2:
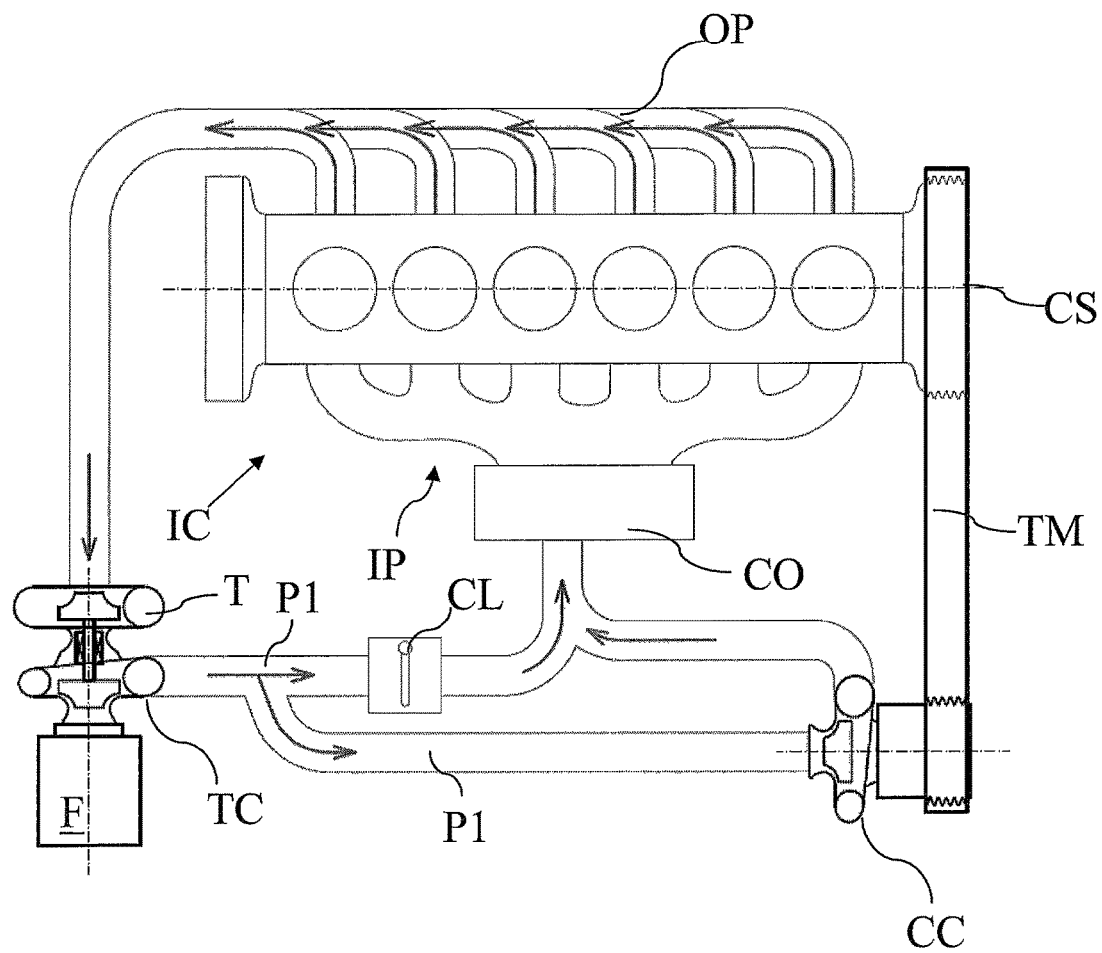
FIGS. 2-4 show preferred embodiments of the invention.
Figure 3:
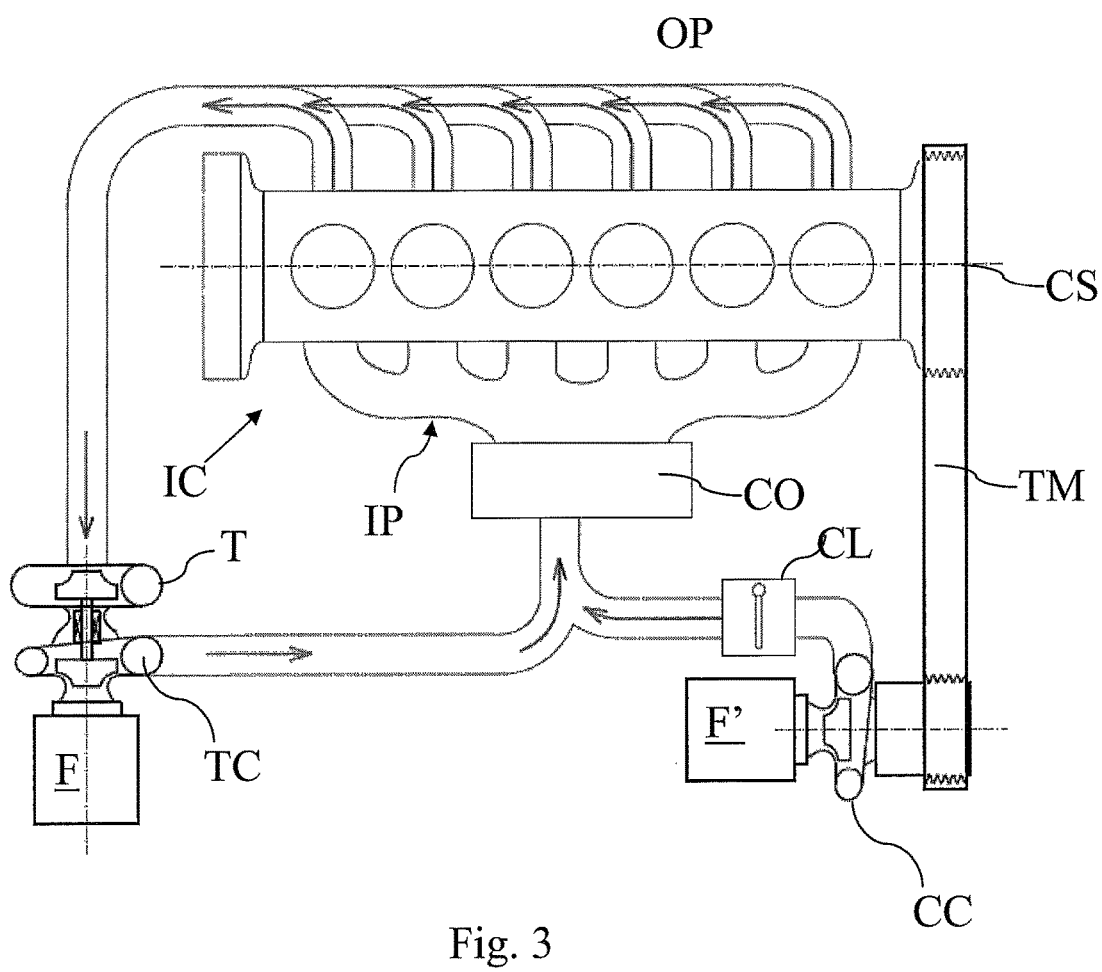
Figure 4:
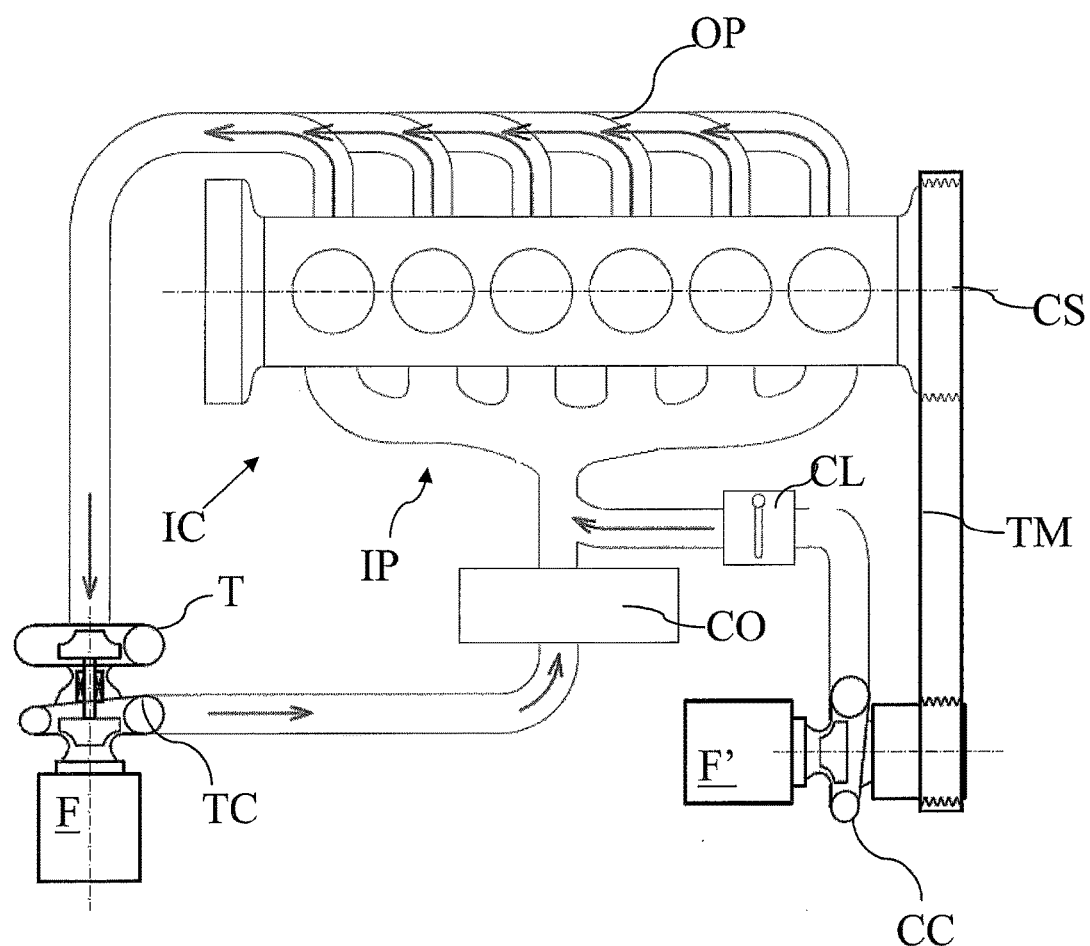

The system that is object of the present invention, with reference to FIGS. 2-4 provides the introduction of a centrifugal supercharger, suitable for supercharging the internal combustion engine IC, in an interval of respective speeds of rotation including a specific speed of rotation corresponding to the critical hull speed, wherein the hull passes from displacement sailing to planing sailing.

According to a preferred alternative embodiment of the invention, said centrifugal supercharger starts supercharging the internal combustion engine IC from about its idle speed and it is then deactivated when the power delivered by the propeller is high enough to have sufficiently rapid dynamics. As an alternative, it is possible to deactivate the centrifugal supercharger as soon as the critical speed of the hull is exceeded or when the main supercharging system, which may equip the engine originally, actually comes into power.

Preferably, the centrifugal supercharger CC activates at a speed about a hundred rpm higher than the idle speed, in order to avoid it to remain active when the engine runs at idle speed. For example, the supercharger CC may be activated from 900 rpm when the engine idle speed is 800 rpm.

For example, if the critical speed is at about 1200 rpm, the centrifugal supercharger may operate in an engine speed interval comprised between 900 and 1300 rpm.

The operating interval of the centrifugal supercharger CC is extremely limited, just 400-600 rpm. The contribution given by such supercharger CC may imply a power increase of the engine, in the same rpm interval comprised between 50% and 200%, thus the engine IC can increase its speed in very few instants for any transition towards planing.

It has been proven that a hull, even equipped with supercharged engine, normally takes 0-25 seconds for planing, while once it is equipped with the present system, it can plane in about 3-5 seconds. In other words, the transition time towards the planing is reduced of up to $1/10$ (and even more) with respect to a boat that is not equipped with the present system.

Such engine speed, in the example 900 and 1300 rpm, can be stored in an electronic control unit for activating/deactivating the centrifugal supercharger CC, as described below.

Figure 1:
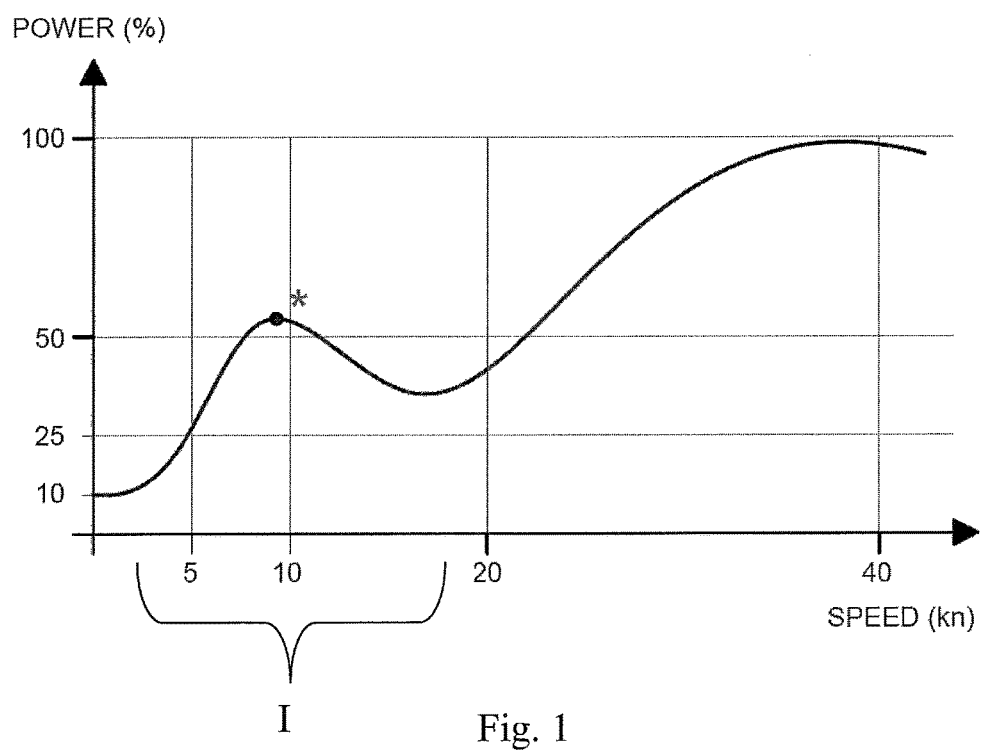
FIG. 1 shows a diagram of the power delivered by the internal combustion engine equipped with the aforementioned system, depending on the hull speed.

FIG. 1 shows a diagram of the power that is necessary to a planing hull and also of the power delivered by the internal combustion engine equipped with such centrifugal supercharger CC.

The effect of the centrifugal supercharger, preferably, is optimized to modify the delivery curve of the power in order to obtain a peak of delivered power, namely a relative maximum, in a predefined interval of revolutions I comprised, for example, between the idle speed and said critical speed, which, in the example, is indicated by an asterisk * and corresponds to about 10 knots. The same FIG. 1 shows that the delivered power peak of the engine IC is placed at about 9 knots, producing a power increase of more than 100%.

It is thus preferable that the centrifugal supercharger is activated in order to give a power peak between the minimum speed and the critical speed *.

Since there is a correspondence between the boat speed and the engine speed, since the gear ratio is assumed as fixed, the interval I, in FIG. 1, identifies the operativeness of the centrifugal supercharger CC between a speed almost equal to zero and a speed exceeding the critical speed * of the hull.

According to a preferred alternative embodiment of the present invention, the centrifugal supercharger CC delivers a pressure exceeding 0.5 bar and preferably of about 0.7 bar already at about 1000/1200 rpm of the internal combustion engine.

According to a preferred alternative embodiment of the invention, such centrifugal supercharger CC is activated in order to have a speed of about 30000 rpm and preferably near 100000, in correspondence of said 1000-1200 rpm of the internal combustion engine.

It is evident that, in case of mechanical connection between the centrifugal supercharger and the driving shaft, the gear ratio may be far higher than 1:30.

According to a preferred alternative embodiment of the invention, such centrifugal supercharger CC is activated by a speed multiplying epicycloidal gear connected to the driving shaft CS of the internal combustion engine IC by means of a belt drive or by an electric motor not shown. Such solution, in addition to ensuring a supercharging at very low speed of the internal combustion engine IC, allows to have very limited losses.

FIGS. 2-4 show a one-stage supercharged internal combustion engine equipped with the present system for aiding the planing.

The present system can be applied also to aspirated engines and to two- (or more) stage supercharged engines.

With reference to FIG. 3, the internal combustion engine IC has a turbine T connected to the exhaust manifold OP. Such turbine T is axially connected to a supercharger TC which sucks air from a filter box F and introduces it into the intake manifold IP of the engine IC, preferably through an intercooler CO.

The centrifugal supercharger CC is mechanically connected to, to be driven by, the driving shaft CS of the engine IC by means of speed multipliers TM. It sucks fresh air through a filter box F' which may or may not coincide with the aforementioned filter box F, in order to introduce compressed air into the intake manifold IP.

Preferably, between the output of the centrifugal supercharger CC and the intake manifold IP a Clapet valve is present in order to isolate the output of the centrifugal supercharger CC when the supercharger TC starts operating.

According to FIG. 3, the centrifugal supercharger CC introduces compressed air upstream of the intercooler CO, when present. On the contrary, according to FIG. 4, the centrifugal supercharger CC introduces compressed air in the intake manifold IP downstream of the intercooler, considering the direction of the air, while the supercharger TC introduces compressed air upstream of the intercooler CO, considering the direction of the air.

According to the diagram of FIG. 2, the system comprises an internal combustion engine IC comprising an intake manifold IP and an exhaust manifold OP, a turbo-supercharger T,TC and a centrifugal supercharger CC driven by speed multiplying means TM. The supercharger TC of the turbo-supercharging stage T,TC has an output connected to the intake manifold IP. The input of the centrifugal supercharger CC is connected with the output of the supercharger TC defining a connection point P1. Also the centrifugal supercharger CC has an output connected to the intake manifold. In the portion connecting the point P1 and the intake manifold IP a Clapet valve is present. When the engine IC runs at a lower speed, the supercharger TC is substantially inactive, thus the Clapet valve stops the connection between the output of the supercharger TC and the intake manifold IP, in order to avoid that the compressed air from the centrifugal supercharger CC may recirculate between the superchargers TC and C. When the supercharger TC starts working, the Clapet valve CL opens, connecting the output of the supercharger TC with the intake manifold IP.

The input of the supercharger TC is connected to the filter box F.

The fact that the two superchargers are connected in series between each other, until the Clapet valve CL is closed, determines a beneficial fluxation of the supercharger TC. Thus, the supercharger TC can start before than it would do without the supercharger CC.

In an intermediate phase, namely before the full opening of the Clapet valve, the supercharging of the supercharger TC sums up to the supercharging of the centrifugal supercharger CC, by means of the supercharger CC itself and/or in parallel with it. When the supercharging of the supercharger TC prevails, the Clapet valve fully opens, connecting directly the supercharger TC to the intake manifold IP, namely not only by means of the centrifugal supercharger CC.

This solution allows power increases of even 100% in correspondence of the supercharging peak of the system, namely preferably before the critical speed of the engine IC.

According to other preferred embodiments of the invention, combined with the two previous ones, the centrifugal supercharger is driven by an electric engine, not shown, powered by batteries and/or by an electric generator connected to the driving shaft and/or to the turbine T or to another turbine (not shown) connected in series or in parallel with said turbine T.

The mechanical connection of the centrifugal supercharger CC, when driven by the engine IC, may be deactivated by an electromagnetic clutch, or by another similar device, according to the speed of the engine IC or to the supercharging pressure at the intake manifold, or manually. According to a preferred alternative embodiment of the invention, an electronic control unit controls such clutch according to the engine speed and/or to the supercharging pressure.

According to another preferred alternative embodiment, the activation of such centrifugal supercharger is performed only during the acceleration towards the planing, and not during the deceleration towards the displacement.

Thus such electronic control unit detects an acceleration command from the driver and, consequently, if the engine is lower than a critical speed it commands the closing of such electromagnetic clutch, in order to activate the centrifugal supercharger.

According to the present invention, such centrifugal supercharger has to operate occasionally, only during the acceleration, in order to facilitate the transition from hull displacement to hull planing, thus the centrifugal supercharger may be inexpensive and not dimensioned for a continuative use, as, on the contrary, is the case for the superchargers that possibly equip the engine originally.

The present invention may advantageously be realized by means of a computer program, which comprises program code means performing one or more steps of said method, when said program is run on a computer. For this reason the scope of the present patent is meant to cover also said computer program and the computer-readable means that comprise a recorded message, such computer-readable means comprising the program code means for performing one or more steps of such method, when such program is run on a computer.

From the description set forth above it will be possible for the person skilled in the art to embody the invention with no need of describing further construction details. The elements and the characteristics described in the different preferred embodiments may be combined without departing from the scope of the present application.

The invention claimed is:

1. System for aiding the planing of a planing boat comprising
a hull having a critical transition speed (*) from a displacement sailing to a planing sailing and
at least an internal combustion engine (IC) comprising means to transmit an engine displacement power to the water, said transmission means defining a gear ratio and identifying a critical speed of the at least an internal combustion engine (IC) corresponding to said critical transition speed (*);
the system comprising a centrifugal supercharger (CC) for supercharging said internal combustion engine (IC) activated by means of speed multiplying means to be operating in only a predetermined interval of speeds of rotation of the at least an internal combustion engine including said critical engine speed.

2. System according to claim 1, wherein said centrifugal supercharger (CC) is operating with its own speed of rotation of at least 30,000 rpm.

3. System according to claim 1 wherein a supercharging pressure of the centrifugal supercharger (CC) is at least 0.5 bar in said predetermined interval (I) of speeds of rotation of the internal combustion engine (IC).

4. System according to claim 1, wherein a supercharging peak of the centrifugal supercharger (CC) is comprised between an idle speed and said critical speed of the internal combustion engine (IC).

5. System according to claim 1, wherein said speed multiplying means comprise a speed multiplying epicycloidal gear.

6. System according to claim 1, wherein said speed multiplying means are connected to, to be driven by, a driving shaft (CS) of said internal combustion engine (IC).

7. System according to claim 1, further comprising an electric motor and wherein said speed multiplying means are connected to, to be driven by, said electric motor.

8. System according to claim 1, further comprising a clutch to activate/deactivate said speed multiplying means.

9. System according to claim 1, further comprising means for controlling (ECI) said clutch according to at least one of the following parameters;
speed of rotation of the internal combustion engine (IC) and/or
acceleration or release command received by the internal combustion engine (IC).

10. System according to claim 9, wherein said control means are suitable to activate the closing of said clutch only during an acceleration of the internal combustion engine.

11. System according to claim 1, wherein said internal combustion engine (IC) comprises an intake manifold (IP) and a further supercharger (TC), an output of the further supercharger (TC) is connected to said intake manifold (IP); an output of said centrifugal supercharger (CC) is connected to said intake manifold (IP).

12. System according to claim 11, wherein said output of said further supercharger (TC) is connected to said intake manifold (IP) by means of a valve (CL) to isolate the further supercharger (TC) when said centrifugal supercharger (CC) is activated and/or wherein said output of said centrifugal supercharger (CC) is connected to said intake manifold (IP) by means of a valve (CL) to isolate the centrifugal supercharger (CC) when said further supercharger (TC) is activated.

13. System according to claim 1, wherein said predetermined interval of speeds of rotation is comprised between about an idle engine speed (IC) and 1600 rpm.

14. System according to claim 1, wherein said predetermined interval of speeds of rotation is centred on said critical engine speed.

15. System according to claim 1, wherein said predetermined interval has an upper limit corresponding to a speed of rotation equal to the critical engine speed plus 100-200 rpm.

16. System according to claim 1, wherein said predetermined interval has a lower limit corresponding to said engine idle speed.

17. System according to claim 1, wherein said predetermined interval has a lower limit corresponding to said engine idle speed plus 100-200 rpm.

18. System according to claim 1, wherein said internal combustion engine (IC) comprises a further supercharger (TC) having a respective second minimum engine speed wherein the further supercharger (TC) starts to be active and wherein said predetermined interval (I) has an upper limit corresponding to said second engine minimum speed.

19. Method for controlling the supercharging of a system for aiding the planing of a system according to claim 1, the method comprising:
providing a system according to claim 1; and
activating said centrifugal supercharger (CC) between about an idle speed of the internal combustion engine (IC) and 1600 rpm.

20. Method according to claim 19, comprising the step of activating said centrifugal supercharger (CC) only during an acceleration step of the internal combustion engine (IC) with the sailing boat at a speed lower than said critical planing speed.

21. Internal combustion engine (IC) comprising an intake manifold (IP) and an exhaust manifold (OP), a turbo-supercharging stage (T,TC), wherein an output of said supercharger (T) is connected with said intake manifold (IP), characterized in that it comprises a centrifugal supercharger (CC) driven by speed multiplying means (TM) having an input connected with said supercharger output (TC) defining a connection point (P1) and an output connected with said intake manifold (IP) and wherein a Clapet valve (CL) is arranged between said connection point P1 and the intake manifold (IP) of the internal combustion engine (IC).

22. Computer program comprising program code means suitable for performing the steps of claim 19, when such program is run on a computer.

23. Computer-readable means comprising a recorded program, said computer-readable means comprising program code means suitable for performing the steps according to claim 19, when said program is run on a computer.

24. Planing boat comprising a hull having a critical transition speed from a displacement sailing and a planing sailing and at least an internal combustion engine (IC)

having a driving shaft (CS) connected to a propeller to move the boat; propeller shape parameters define a critical speed of rotation of the at least an internal combustion engine (IC) corresponding to said critical transition speed; the boat having a system for aiding the planing according to any of claim 1.

* * * * *